US010539120B2

(12) United States Patent
Uliano (10) Patent No.: US 10,539,120 B2
(45) Date of Patent: Jan. 21, 2020

(54) TO WIND TURBINE USING A ROTOR FOR ROADS

(71) Applicant: Eti Galvani Uliano, Braço do Norte (BR)

(72) Inventor: Eti Galvani Uliano, Braço do Norte (BR)

( * ) Notice: Subject to any disclaimer, the term of this patent is extended or adjusted under 35 U.S.C. 154(b) by 0 days.

(21) Appl. No.: 16/060,271

(22) PCT Filed: Nov. 11, 2016

(86) PCT No.: PCT/BR2016/050294
§ 371 (c)(1),
(2) Date: Jun. 7, 2018

(87) PCT Pub. No.: WO2017/100884
PCT Pub. Date: Jun. 22, 2017

(65) Prior Publication Data
US 2019/0003458 A1    Jan. 3, 2019

(30) Foreign Application Priority Data

Dec. 16, 2015 (BR) .............................. 202015031597

(51) Int. Cl.
*F03D 9/00* (2016.01)
*H02P 9/04* (2006.01)
*F03D 9/32* (2016.01)
*H02S 10/12* (2014.01)
*B60K 16/00* (2006.01)
(Continued)

(52) U.S. Cl.
CPC ............... *F03D 9/32* (2016.05); *B60K 16/00* (2013.01); *H02K 7/183* (2013.01); *H02S 10/12* (2014.12); *B60K 2016/006* (2013.01); *F03D 1/04* (2013.01)

(58) Field of Classification Search
CPC ........................................................ F03D 9/46
See application file for complete search history.

(56) References Cited

U.S. PATENT DOCUMENTS 4,237,384 A * 12/1980 Kennon ................ F03D 3/0472
290/55
4,329,593 A * 5/1982 Willmouth .............. F03D 3/065
290/44

(Continued)

*Primary Examiner* — Tulsidas C Patel
*Assistant Examiner* — Thomas K Quigley
(74) *Attorney, Agent, or Firm* — Houtteman Law LLC; Scott Houtteman (57) ABSTRACT

This presents a Utility Model related to an improvement introduced in a piece of equipment conceived to capture wind power generated by the displacement of trains, subways, vehicles in general—overall trucks—along railroads, roads, etc., and to convert it in electrical power, thus using such considerable energetic potential. Considering that the assembly of one or a plurality of wind rotors (P) and respective electricity generators (G) are assembled on semi-tows (K) of the type engaged and handled by a truck (mechanical horse), considering that the trailers (K) provided with means for storing the electrical power generated, such as batteries (B), or other means for electricity transmission and storage. Thus, the aerogenerators (P) may be displaced to the points with the biggest flow of passing vehicles, and may also be positioned on the direction where the natural (predominant) winds are favorable to the best use of the wind potential.

2 Claims, 7 Drawing Sheets

(51) Int. Cl.
*H02K 7/18* (2006.01)
*F03D 1/04* (2006.01)

(56) References Cited

U.S. PATENT DOCUMENTS

| | | | | |
|---|---|---|---|---|
| 5,272,378 | A * | 12/1993 | Wither | F03D 3/065 290/1 R |
| 6,051,892 | A * | 4/2000 | Toal, Sr. | F03B 17/005 290/43 |
| 6,409,467 | B1 * | 6/2002 | Gutterman | F03D 9/25 415/4.3 |
| 6,809,432 | B1 * | 10/2004 | Bilgen | F03D 13/20 290/55 |
| 7,547,984 | B2 * | 6/2009 | Fein | B82Y 15/00 290/44 |
| 8,536,720 | B2 * | 9/2013 | Bates | F03D 3/005 290/44 |
| 9,353,730 | B2 * | 5/2016 | Knight | F03D 80/88 |
| 2007/0018461 | A1 * | 1/2007 | Hardy | F03B 17/005 290/54 |
| 2007/0059097 | A1 * | 3/2007 | Chen | B60L 8/00 404/71 |
| 2008/0149573 | A1 * | 6/2008 | Fein | B01D 1/0011 210/799 |
| 2008/0154801 | A1 * | 6/2008 | Fein | B60K 16/00 705/412 |
| 2008/0196758 | A1 * | 8/2008 | McGuire | F03D 9/007 136/245 |
| 2012/0049538 | A1 * | 3/2012 | Periasamy | A43B 3/00 290/1 C |
| 2012/0153632 | A1 * | 6/2012 | Suttisiltum | F03D 3/0427 290/55 |
| 2014/0361540 | A1 * | 12/2014 | Knight | F03D 80/88 290/44 |
| 2016/0281938 | A1 * | 9/2016 | Carpoff | F21L 13/00 |
| 2018/0102689 | A1 * | 4/2018 | Martinez Ruvalcaba | H02K 7/183 |
| 2018/0102690 | A1 * | 4/2018 | Martinez Ruvalcaba | H02K 7/183 |

* cited by examiner

TO WIND TURBINE USING A ROTOR FOR ROADS

FIELD OF THE INVENTION

This Utility Model refers to an improvement introduced in a piece of equipment conceived to capture wind power generated by the displacement of trains, subways, vehicles—overall trucks—along railroads, roads, etc., and to convert it in electrical power, thus using such considerable energetic potential. Considering that this utility model stands out from the state-of-the-technique due to allowing said equipment to be—whenever deemed necessary—displaced and positioned on strategic spots of the railroad or road where the conditions for power generation are more favorable (flow and predominance of winds).

STATE-OF-THE-ART

The search for new power source alternatives is a constant for the current civilization, wherein there is a growing electricity consumption. On the other hand, there is also a growing concern for the generation of electrical power to have its environmental impacts minimized, for the biggest electricity generators are still hydropower plants, thermo power plants and atomic power plants, which, each at their own way, negatively affect the environment, whether by exploitation and pollution caused by the fuel consumed; whether due to the large areas flooded; or due to the operational risks involved. In its turn, there are means of generation of so-called electric power, i.e., not causing environmental damage, and that are the sun collectors and wind power plants in open field, but that still have no large representativeness in the sector of electrical power generation, since they demand a high investment in face of a low volume of power generated.

Brazil, in its turn, just as the vast majority of the developed or developing countries, have a large road network on their territory. Considering that, on those roads, millions of small, medium or large motor vehicles travel on a daily basis. And due to their aerodynamic features, the totality of those vehicles—upon traveling on the road—continuously displace a considerable air mass, generating winds at the sides of said road. Noting this energetic potential, one idealized the construction of small wind generators specifically designed to be fixed at the sides of busy roads, and at the reach of the wind currents generated by the displacement of the vehicles and predominance thereof, so as the electric power generated is used for charging the electrical vehicles traveling there or introduced in the distribution network, among other alternatives. The object of Brazilian patent application PI 0603458-6 is also proposed to generate electrical power from the use of the wind potential generated by the displacement of vehicles on roads, however, its constructive setup—as well as that of other solutions proposed—presents some limitations, which can be solved today more effectively, for, due to being an application from 2006, became obsolete, being the main one the fact of wind generators being fixed and non-removable from their place of installation, which limits much the use of all their generation potential, since, for various reasons, the vehicle flow concentration may vary much on certain spots of the roads; or then, the changes of direction of the natural winds may also prejudice the power generation, for natural winds may, on certain occasions, blow on the opposite sense to the vehicles flow, which imposes a contrary force to the wind generators, causing the volume of power generated to suddenly drop.

PURPOSES OF THE INVENTION

With the purpose of transposing the limitations reported, one developed this utility model. Considering that the assembly of one or of a plurality of wind rotors and respective power generators on semi-tows (trailers) of the type engaged and handled by a truck (mechanical horse), considering that trailers provided with means to store the electrical power generated, such as batteries, or other means for electricity transmission or storage. Thus, the aerogenerators may be displaced to the points with the biggest flow of passing vehicles, and may also be positioned on the direction where the natural (predominant) winds are favorable to the best use of the wind potential.

DESCRIPTION OF THE DRAWINGS

For a better comprehension of this utility model, a detailed description thereof is made, making reference to the attached drawings, wherein.

DETAILED DESCRIPTION OF THE INVENTION

According to these illustrations, this utility model comprehends initially a trailer (K) of the type engaged and pulled by a truck of the "mechanical horse" type, and which is thus provided with mechanical or hydraulic frontal feet (A) for support on the ground when disengaged from said truck. Considering that, on the platform (F) of said trailer (K), at least one or a plurality of wind rotors is assembled, which shovels (P) are radially fixed to a central vertical axis (E), which, on its turn, is operatively assembled to an electrical power generator (G), which is fixed on said platform (F) of the trailer (K). Considering that, around the wind rotors, deflective plates (D) are vertically assembled, strategically positioned, which, on their turn, are also fixed or movable on the platform (F) of the trailer (K). And considering that, also on the platform (F) of the trailer (K), or at a strategic location under the platform (F) batteries, transformers, etc. are laid out for storage (B), which are, on their turn, connected to the generators (G), and considering that the batteries (B) are rechargeable.

Figure 1:
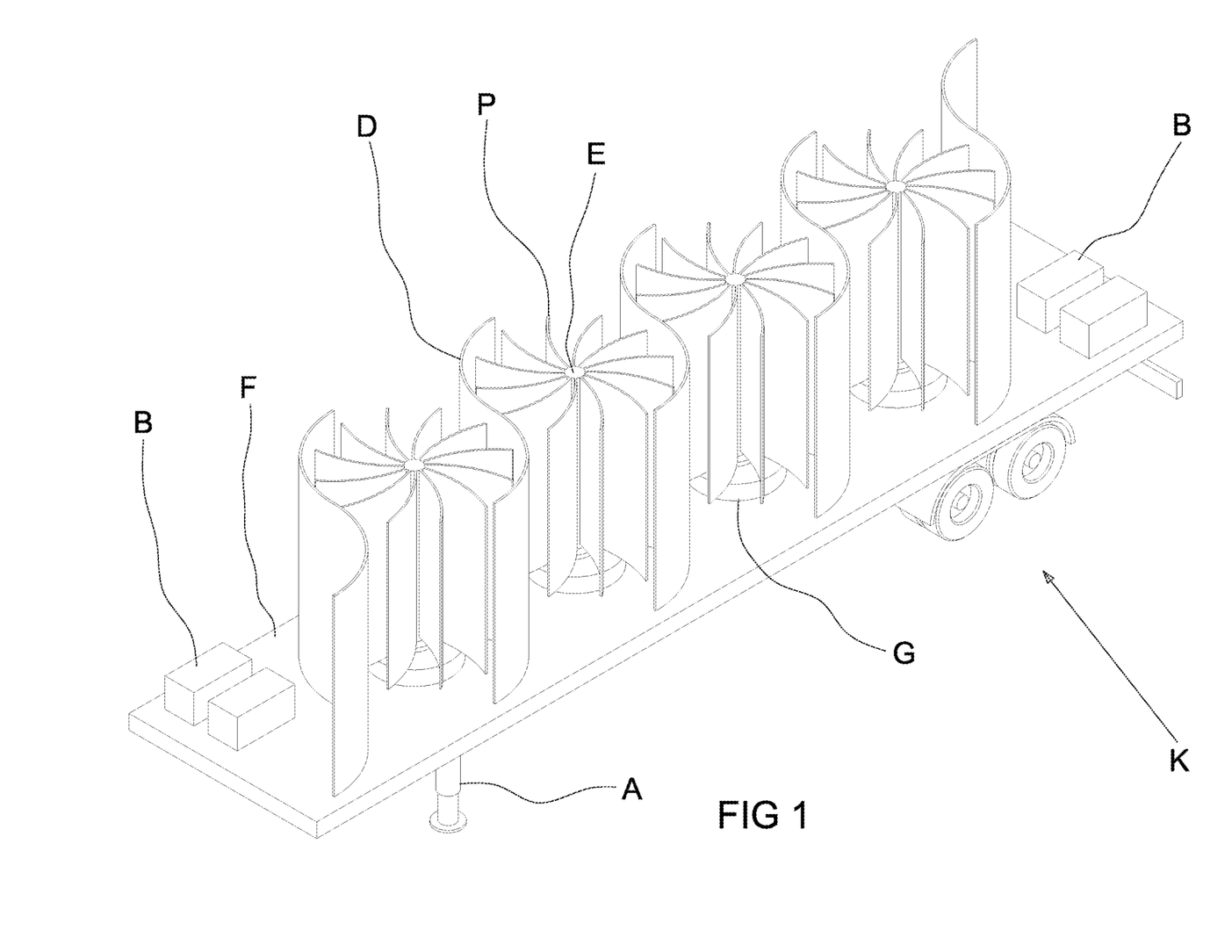
FIG. 1 illustrates the aerogenerator from an anterior perspective.
Figure 2:
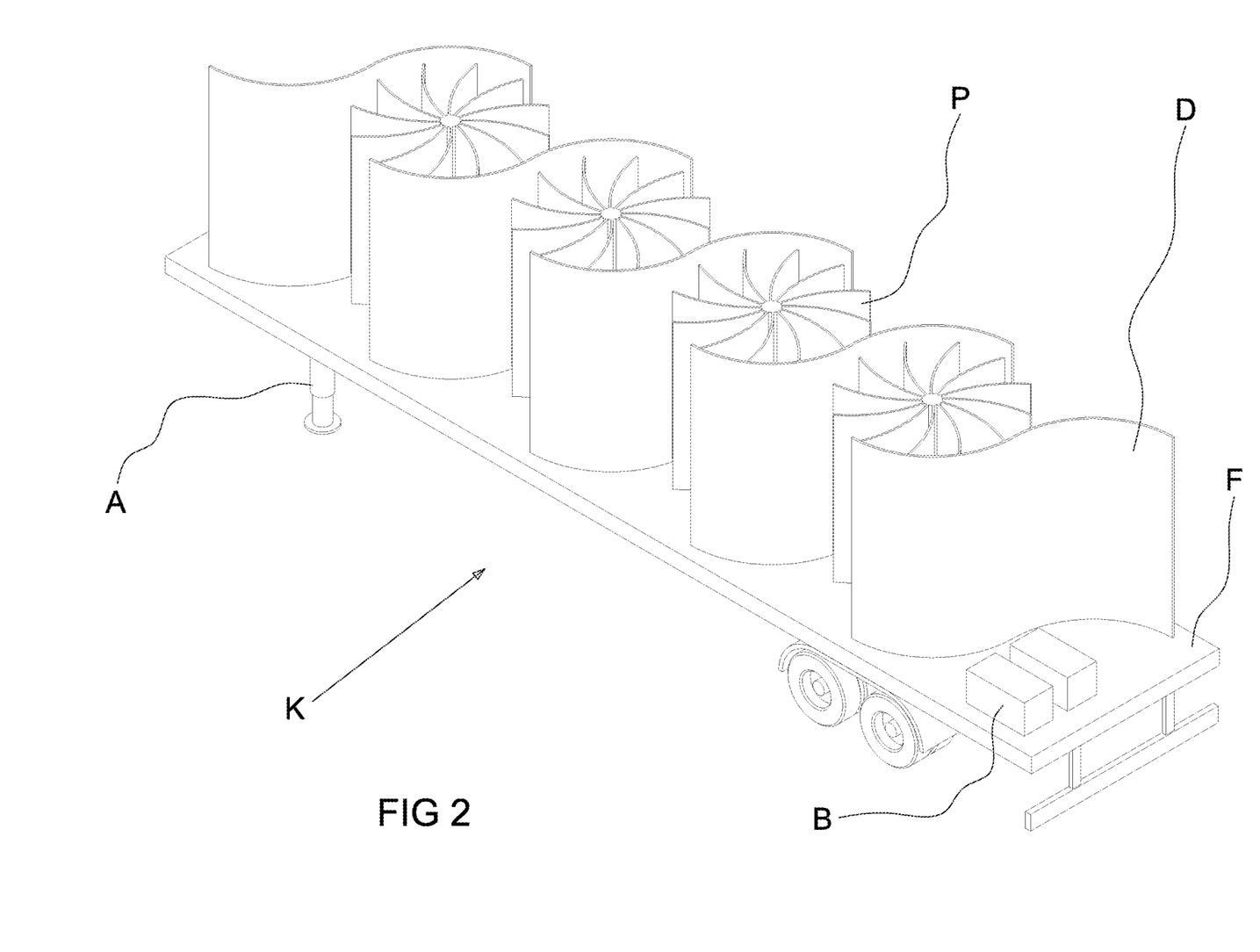
FIG. 2 illustrates the aerogenerator from a posterior perspective.
Figure 3A:
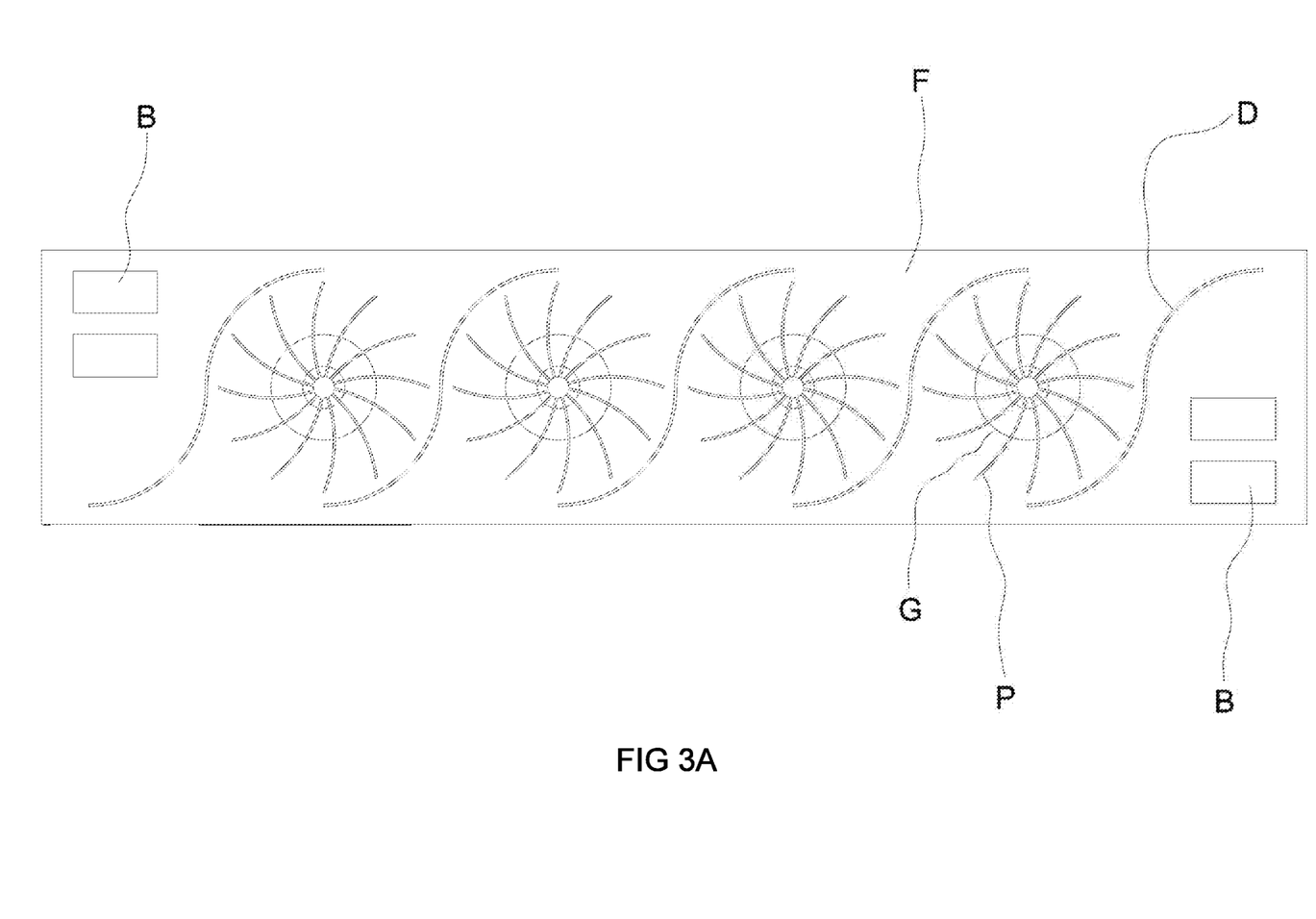
FIGS. 3A-3B illustrate the aerogenerator from a superior view.
Figure 3B:
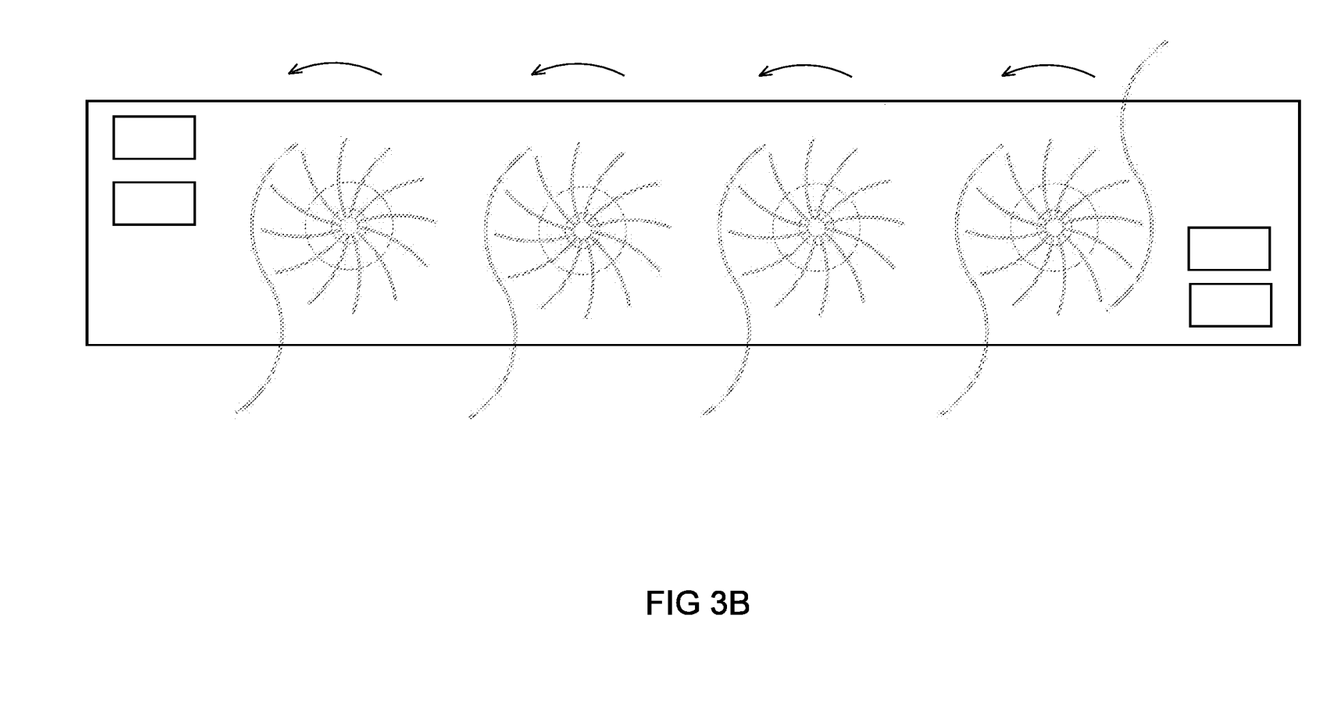
Figure 4:
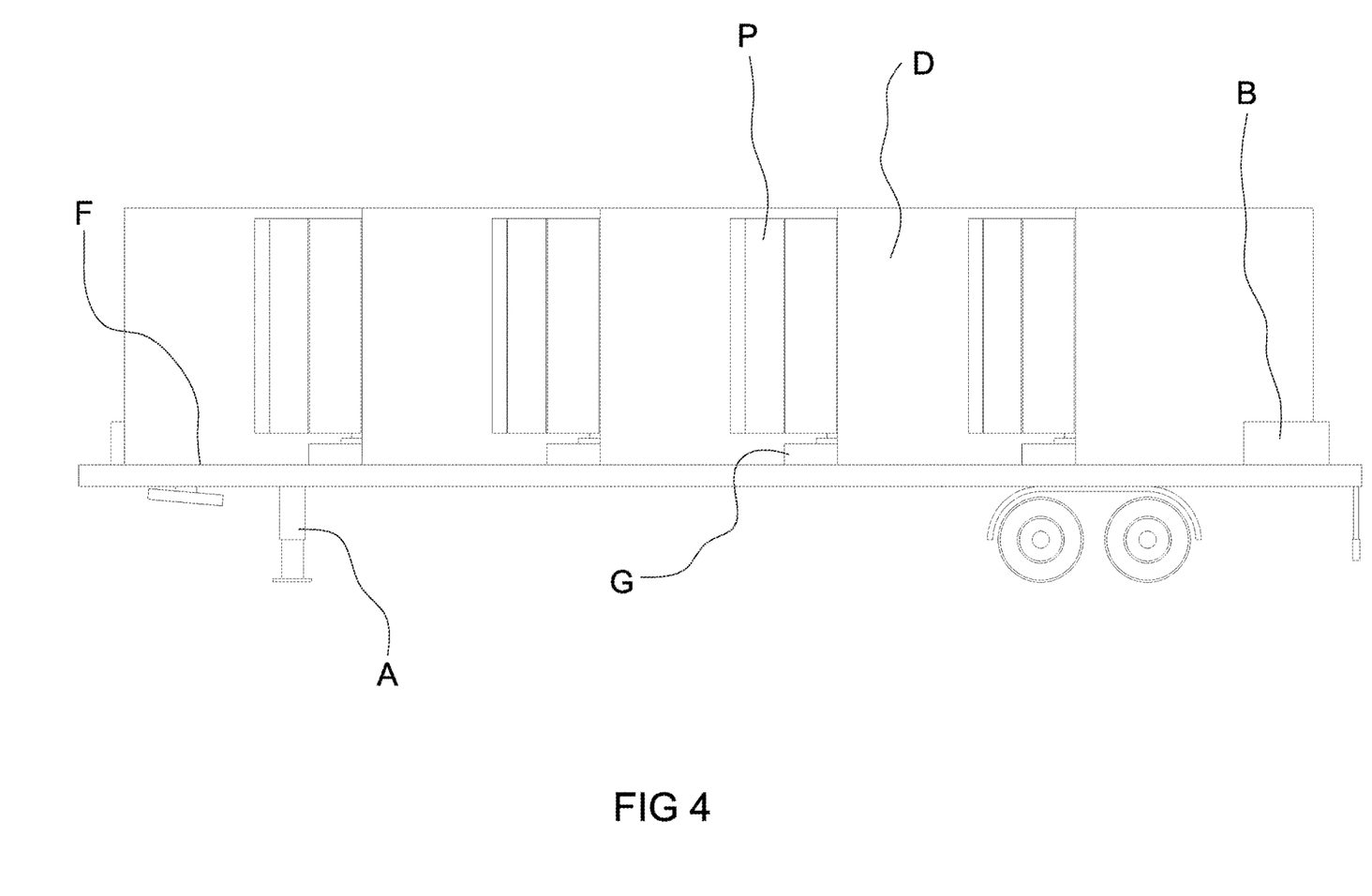
FIG. 4 illustrates the aerogenerator in a lateral elevation.
Figure 5:
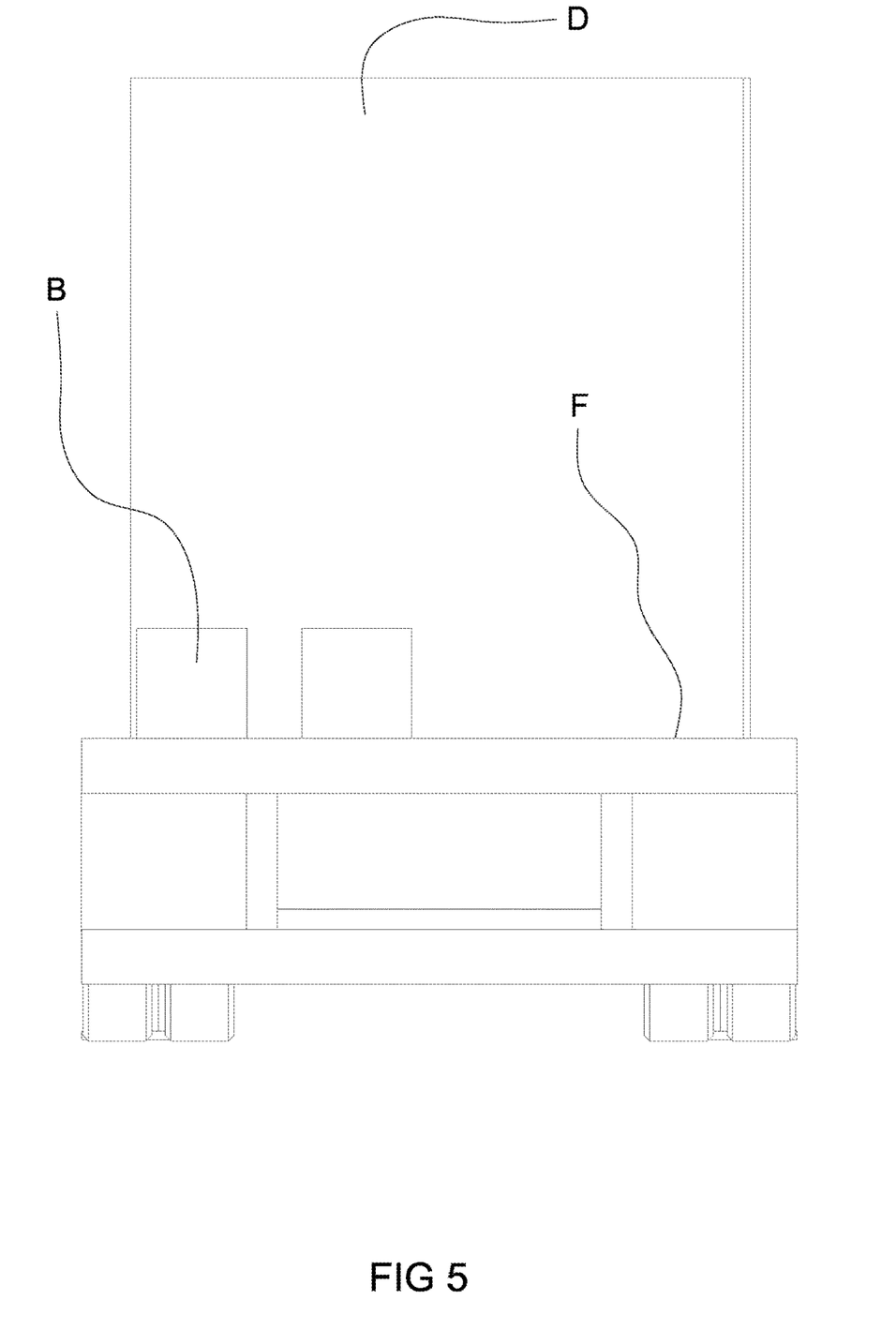
FIG. 5 illustrates the aerogenerator in a posterior elevation.
Figure 6:
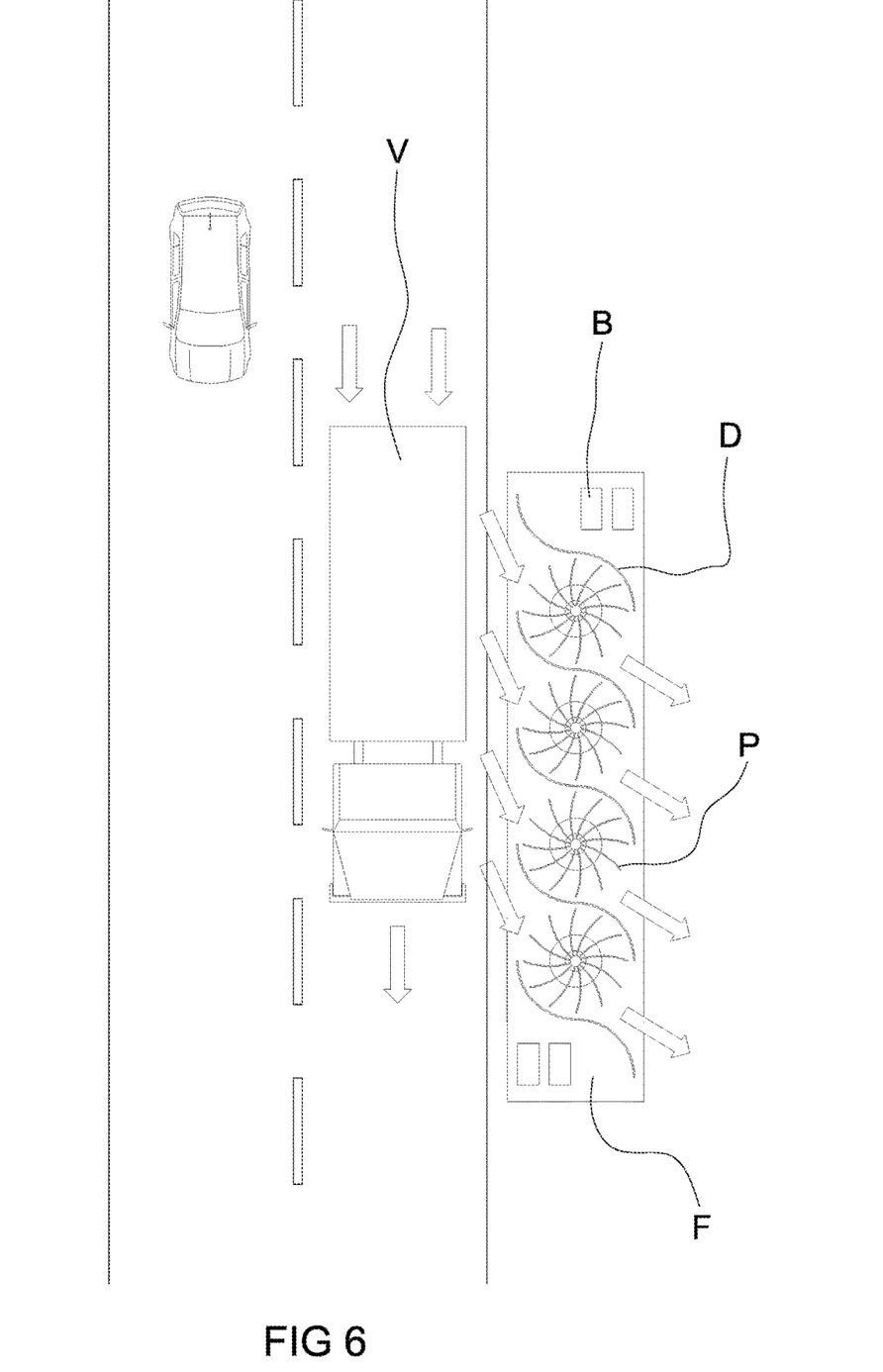
FIG. 6 exemplifies in a superior view the functioning of the aerogenerator positioned at the sides of a road.

The functioning and use of this improvement is very simple and practical. Considering that, from the checking of which spot in the road has the best conditions for wind power capture, such as the biggest vehicles flow, best direction of natural winds (predominance), among others, the trailer (K) is engaged to a truck, which dislocates the set to the determined spot, parking said trailer (K) at the sides of the road, and then disengaging the trailer (K) and leaving it there to generate electrical power from the capture of the winds generated by the displacement of the vehicles (V) on the road, as illustrated by FIG. 6. Considering that part of the air flow displaced by the passing vehicles (V)—mainly trucks—(represented by the arrows in FIG. 6) is directed by the deflectors (D) to the shovels (P) of the rotors. Meanwhile, the truck may continue relocating other aerogenerator units (trailers). And also considering that, after totally charged, the batteries (B) are removed and replaced with batteries (B) to charge, which is carried out by an operation team, which takes the charged batteries (B) to their place of use, which may be varied, for instance: at the local network or recharging electrical vehicles circulating therein or at charging stations.

Logically, this improvement may present variations in its dimensions and proportions, as well as in the geometrical and constructive form of its elements, provided that the basic and essential features to its realization are maintained.

The invention claimed is:

1. An improved wind turbine designed to channel wind from one side of the wind turbine to the other, comprising,
   a trailer operable to be pulled by a truck,
   said trailer having a platform,
   at least one or more wind rotors having curved shovels,
      said shovel medial ends are radially fixed to a central vertical axis which is rotatably mounted on said platform,
      said shovel lateral ends define a circular circumference when the wind rotor is rotating about the vertical axis,
   one or more s-shaped deflective plates vertically mounted adjacent to one of
      said wind rotors and having a surface facing the adjacent wind rotor,
      said surface facing the adjacent wind rotor further comprising one concave portion and one convex portion,
      said concave surface portion is in close proximity to, and complementary in shape to, the adjacent wind rotor circular circumference,
      said convex surface portion extends off of the downwind side of the wind rotor, and
   when said one or more s-shaped deflective plates is flanked by two wind rotors one surface of the plate is in close proximity to, and complementary in shape to, a portion of one flanking wind rotor circular circumference and the other surface of the plate is in close proximity to, and complementary in shape to, a portion of the other flanking wind rotor.
   wherein said one or more s-shaped deflective plates are orientated such that wind enters one side of platform and exits the opposite side of the platform and thus channels wind from one side of the turbine to the other.

2. An improved wind turbine designed to channel wind from one side of the turbine to the other, comprising,
   a trailer operable to be pulled by a truck,
   said trailer having a platform,
   at least one or more wind rotors having curved shovels,
      said shovel medial ends are radially fixed to a central vertical axis which is rotatably mounted on said platform,
      said shovel lateral ends define a circular circumference when the wind rotor is rotating about the vertical axis,
   one or more s-shaped deflective plates vertically mounted adjacent to one of
      said wind rotors and having a surface facing the adjacent wind rotor,
      said surface facing the adjacent wind rotor further comprising one
         concave portion and one convex portion,
         said concave surface portion is in close proximity to, and complementary in shape to, the adjacent wind rotor circular circumference,
         said convex surface portion extends off of the downwind side of the wind rotor, and
      said one or more s-shaped deflective plates vertical mounting is a movable mounting,
   wherein said one or more s-shaped deflective plates are orientated such that wind enters one side of platform and exits the opposite side of the platform and thus channels wind from one side of the turbine to the other.

* * * * *